United States Patent [19]

Ohashi et al.

[11] 4,128,796
[45] Dec. 5, 1978

[54] GAP ELIMINATOR

[75] Inventors: Yasuji Ohashi; Yoichiro Mitani, both of Osaka, Japan

[73] Assignee: NTN Toyo Bearing Company Limited, Osaka, Japan

[21] Appl. No.: 671,377

[22] Filed: Mar. 29, 1976

[30] Foreign Application Priority Data

Apr. 1, 1975 [JP] Japan ................................. 50-40068

[51] Int. Cl.$^2$ ............................................. G05B 21/02
[52] U.S. Cl. ..................................... 318/636; 318/39;
318/563; 318/571
[58] Field of Search .................. 318/636, 571, 563, 39

[56] References Cited

U.S. PATENT DOCUMENTS

| 3,544,875 | 12/1970 | Hara et al. | 318/563 |
| 3,545,310 | 12/1970 | Porath et al. | 318/39 X |
| 3,614,575 | 10/1971 | Cutler | 318/571 X |
| 3,626,262 | 12/1971 | Kelling | 318/39 |
| 3,727,120 | 4/1973 | Jewell et al. | 318/636 |
| 3,805,137 | 4/1974 | Fahrner | 318/636 |
| 3,880,352 | 4/1975 | Ishida et al. | 318/636 |
| 4,000,448 | 12/1976 | Shum et al. | 318/39 |

Primary Examiner—B. Dobeck
Attorney, Agent, or Firm—Hall & Houghton

[57] ABSTRACT

There is disclosed a gap eliminator used for reducing working cycle time in machine tools. With over-all voltage variations in power sources in a factory taken into consideration, an output $f(t_0)$ under no or light load condition of an electric motor and an output $kf(t)$ obtained by attenuating an output $f(t)$ under loaded condition by an attenuator circuit are compared with each other to provide a primary signal, by which the feed rate is controlled. In this operation, particularly when an output obtained through a detecting circuit is an electric power, a circuit for eliminating periodic noise is disposed immediately after the electric power detector in order to eliminate adverse effects on power waves of periodic noise due to a belt. Further, abnormal overload condition is detected to provide a secondary signal, by which the machine is brought to a stop. Other merits and details of the arrangement will be made clear.

2 Claims, 7 Drawing Figures

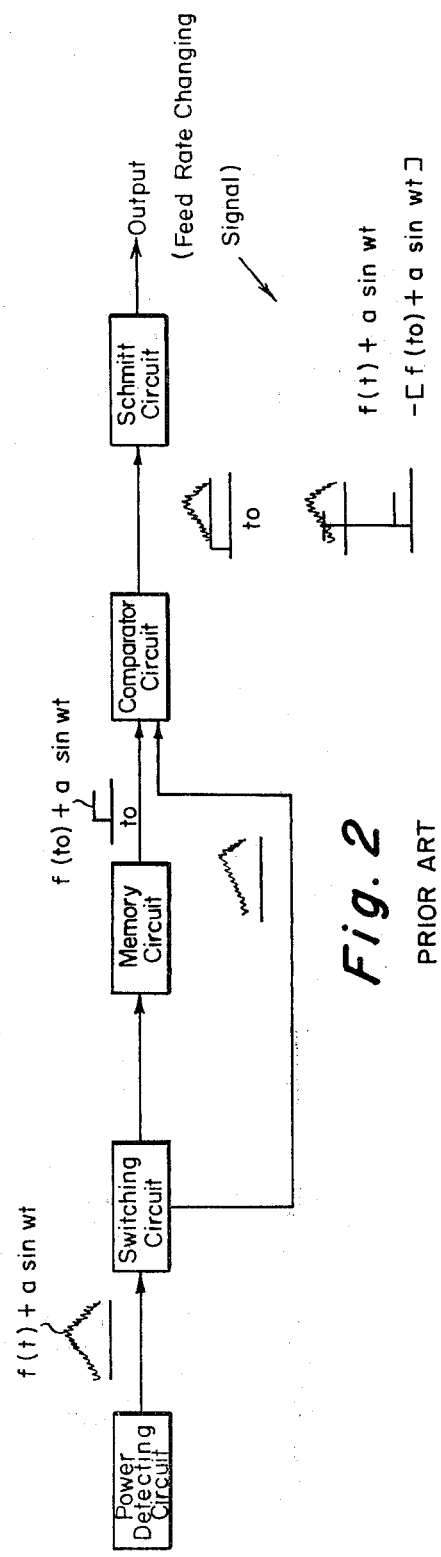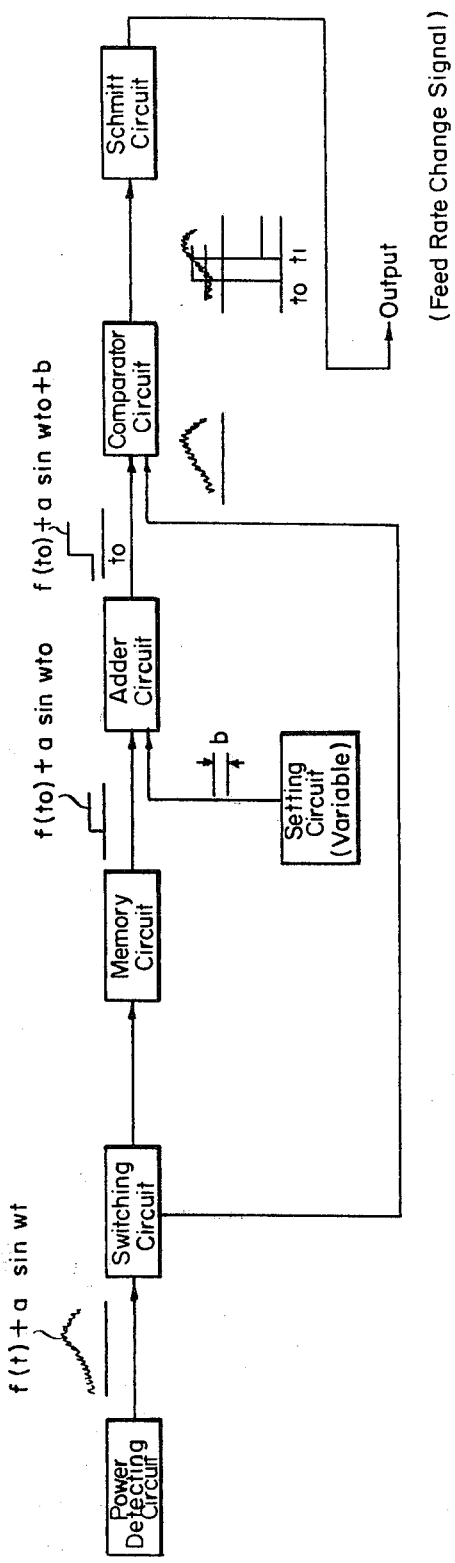

Fig. 4
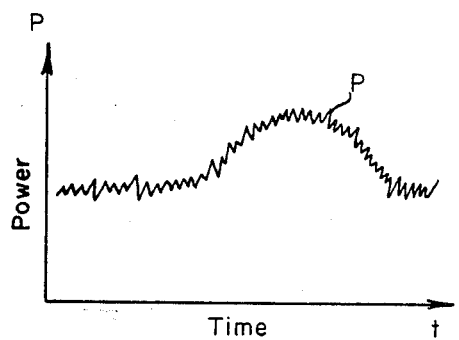
Fig. 5
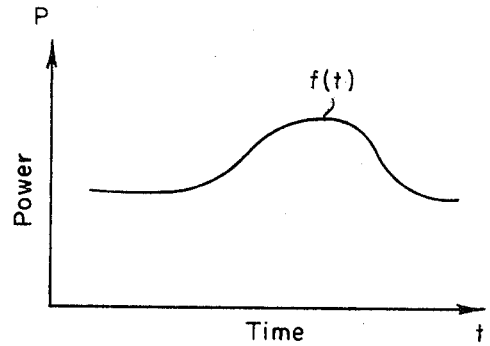
Fig. 6
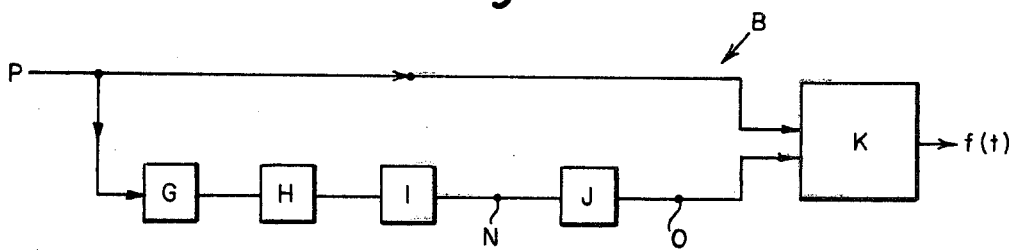
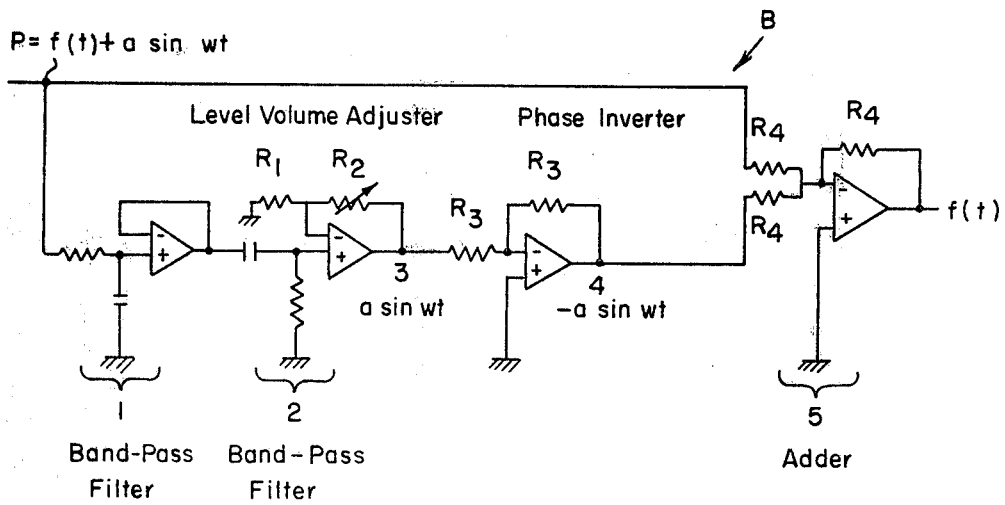
Fig. 7

GAP ELIMINATOR

BACKGROUND OF THE INVENTION (a) Field of the Invention

The present invention relates to a gap eliminator used for reducing working cycle time in machine tools.

(b) Field of the Prior Art

Conventional machine tools have sometimes incorporated therein a circuit which serves as a gap eliminator to eliminate air cut time. In such circuit, only variations in electric power have been taken into consideration, while the scattering of power during idle run (i.e., run when no grinding is being performed) is left unconsidered. Therefore, a reference circuit with power during idle run taken as a reference must be incorporated before such eliminator circuits can be applied to all types of machine tools. In a gap eliminator for reducing working cycle time, when a system for transmitting signals using power is used, periodic noise is produced owing to a belt or the like used, so that the setting of a reference level is difficult. The level of this periodic noise is about 5-15 Hz and elimination of this noise becomes necessary. Now, while it is possible to eliminate this noise only by a low-pass filter, it is known that the response of low-pass filters delays by an amount of about $t_1$ (=CR) seconds, where C is a capacitance and R is a resistance. For example, when it is desired to reduce a periodic noise of 5 Hz to one-tenth, then $t_1$ = 0.32 seconds. When a gap eliminator is used, this delay of $t_1$ seconds will result in a workpiece being worked in quick feed for $t_1$ seconds, thereby destroying the inherent function of the gap eliminator.

As concrete examples of known gap eliminators, there are circuit arrangements shown in FIGS. 1 and 2 for machine tools utilizing electric power, wherein in a cutting, grinding or other machining operation, approach feed effected between the tool rest and the work table is made variable and means is provided for eliminating air cut time which does not contribute to substantial machining operation. The apparatus shown in FIG. 1 is arranged as follows. An unadjusted output $f(t) + a \sin \omega t$ from a power detecting circuit arranged to detect the electric power consumed by an electric motor for driving a grinding wheel is inputted into a switching circuit. When a signal from a limit switch (not shown) for ascertaining a return end for the grinding wheel rest is given, the output $f(t) + a \sin \omega t$ from the power detecting circuit is inputted into a memory circuit through the switching circuit. As a result, the memory circuit stores a power consumption value $f(t_0) + a \sin \omega t_0$ indicated immediately before the grinding wheel leaves the return end, said value being then fed into a comparator circuit. In this comparator circuit, a power consumption value $f(t) + \sin \omega t$ indicated when the grinding wheel is advancing has been inputted. Thus, the output deviation between the two input values, $\{f(t) + a \sin \omega t\} - \{f(t_0) + \sin \omega t_0\}$, is fed into a Schmitt circuit and sent as an output to a feed control circuit. The feed control circuit has successively inputted thereinto a start command, an operation signal for the Schmitt circuit, a precision grinding signal and a fixed sizing signal and it is adapted to successively send a quick feed command, a rough grinding command, a precision grinding command and a stop signal to a feed device (not shown); it sends a quick return command a predetermined period after the stop signal has been sent.

The apparatus shown in FIG. 2 is arranged as follows. An unadjusted output $f(t) + a \sin \omega t$ from a power detecting circuit is divided into parts under no load and loaded conditions, respectively, which are then fed to a comparator circuit. The output $f(t) + a \sin \omega t$ under no load condition is fed to a memory circuit and a power consumption value $f(t) + a \sin \omega t_0$ indicated immediately before the grinding wheel leaves a return end is stored. A predetermined value $b$ from a setting circuit is added in an adder circuit, whose output $f(t) + a \sin \omega t_0 + b$ is inputted into the comparator circuit. On the other hand, a power consumption value $f(t) + a \sin \omega t$ indicated when the grinding wheel is advancing is inputted into the comparator circuit by a switching circuit. Thus, the comparator circuit sends an output deviation between these two inputs, $\{f(t) + a \sin \omega t\} - \{f(t) + a \sin \omega t_0 + b\}$, to a speed change control circuit. The manner in which a feed control circuit is controlled by said output is the same as in the apparatus shown in FIG. 1 and hence a description thereof is omitted.

Now, the two examples described above leave the following conditions unconsidered. First, power waves themselves have subtle chattering due to noise, and the presence of this chattering greatly influences the working conditions of gap eliminators, as described above. Second, owing to the elasticity of the grinding wheel and workpiece, there is sometimes a very small time lag in the value at the instant that the grinding wheel strikes the workpiece. Third, overall variations in electric power are not taken into consideration. Because of these problems, the present situation is that 100% satisfactory and extremely accurate control cannot be expected with respect to the control of the change of the feed rate of the grinding wheel.

SUMMARY OF THE INVENTION

The present invention relates to an air cut time eliminating apparatus for use in machine tools, namely, a gap eliminator. More particularly, it relates to an apparatus comprising a device for comparing an output $f(t_0)$ under no or light load condition with an attenuated output $kf(t)$ under loaded condition to provide the deviation value as its output, and a circuit incorporated in said device for detecting abnormal overload condition to produce a signal.

FEATURES OF THE INVENTION

With attention paid to the above problems inherent in the prior art, the present invention has accomplished the investigation and solution of these problems. In constructing an air cut time eliminating apparatus, namely a gap eliminator, for controlling the change of feed rate of a grinding wheel used in a machine tool, the present invention provides a circuit arrangement designed to satisfy the following conditions: First, the utilization of variations in power consumption or current; second, the elimination of periodic noise included in power waves; third, the storage of a sample value under no or light load condition in a sample hold circuit using an FET (field-effect transistor) as a switch; fourth, the use of that output as a comparison input which is attenuated with a damping factor $0 < k < 1$ with consideration given to infinitesimal time lag from the output under no load condition; and, fifth, the sending of a signal under abnormal load condition for stopping the machine.

BRIEF DESCRIPTION OF THE DRAWINGS

FIGS. 1 and 2 are block diagrams of conventional gap eliminators for use in grinding machines;

FIG. 4 is a view showing the relationship between electric power ($p$) and time ($t$);

FIG. 5 is a view showing the relationship between time ($t$) and a desired signal $f(t)$ included in the present invention;

FIG. 6 is a block diagram of a circuit for eliminating periodic noise which is one of the important elements of the present invention; and FIG. 7 is a detailed view of FIG. 6.

DESCRIPTION OF THE PREFERRED EMBODIMENTS

Figure 3:
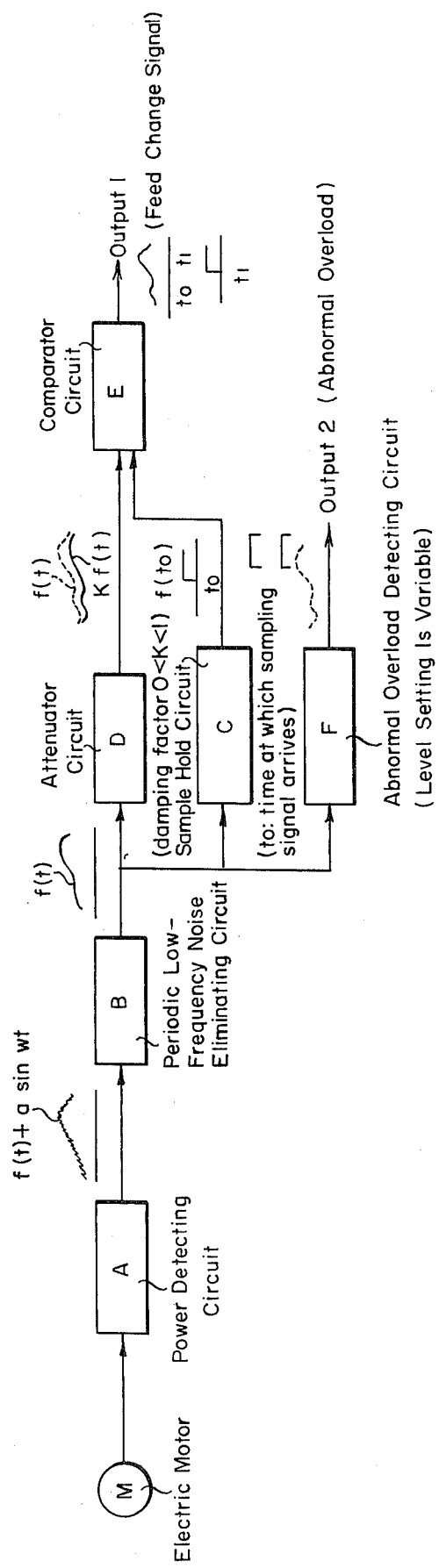
FIG. 3 is a blcok diagram showing a circuit arrangement for a gap eliminator for use in grinding machines according to the present invention.

An air cut time eliminating apparatus, namely, a gap eliminator, according to the present invention, as shown in FIG. 3, comprises a power detecting circuit (A), a periodic low-frequency noise eliminating circuit (B), a sample hold circuit (C), an attenuator circuit (D), a comparator circuit (E) and an abnormal overload value detecting circuit (F). In addition, the Figure, (M) designates an electric motor. The power circuit (A) serves to detect the ever-changing power consumption of the associated electric motor. In the case of detection of current, it will be replaced by a current detecting circuit.

The function of the periodic low-frequency noise eliminating circuit (B) is to eliminate noise from a signal containing periodic noise. As a method therefor, there are provided a band-pass fiter circuit → a level adjusting circuit → a phase inverter circuit so as to satisfy the relation $f(t) = P - a \sin \omega t$ and it is added to power P.

Generally, the relationship between power (P) and time ($t$) is represented by a moving zigzag form, as shown in FIG. 4. The present invention is intended to convert the relationship between power (P) and time ($t$) into the relationship between a desired signal $f(t)$ and time ($t$), as shown in FIG. 5.

Generally, power (P) is expressed by the following equation. $P = f(t) + a \sin \omega t$ (where a is a coefficient) ... (1) Since the desired signal is $f(t)$, from the equation 1 we obtain, $$f(t) = P - a \sin \omega t \qquad (2)$$

Therefore, it is seen from the equation 2 that the desired signal $f(t)$ may be obtained by producing a signal $-a \sin \omega t$ and then adding it to power (P) in an adder circuit.

FIG. 6 is a block diagram of the periodic lowfrequency noise eliminating circuit (B). In this circuit, (G) and (H) designate band-pass filter circuits; (I), a level adjuster circuit; (J), a phase inverter circuit; and (K) designates an adder circuit. In addition, (L), (N) and (O) indicate points of passage of power (P) and signal wave. That is, signal wave is fed into the band-pass filter circuits (G) and (H) so as to be in phase with $a \sin \omega t$, then into the level adjuster circuit (I), whose volume R2 is adjusted to cause it to appear as $a \sin t$ at point N, whose phase is then inverted so as to provide $-a \sin \omega t$ at point O by the phase inverter circuit (J), and finally power (P) and the signal wave $-a \sin \omega t$ which has passed through point O are added together in the adder circuit (K) to provide the desired signal $f(t)$. In addition, in the band-pass filter circuits (G) and (H), the capacitance C and volume R are set so that $CR = 1$.

The sample hold circuit (C) serves to appoint a value under no light load condition corresponding to the power or current in the associated electric motor on the basis of an external signal and hold said value for a necessary period of time. The attenuator circuit (D) serves to attenuate a value corresponding to the power consumption or current in the associated electric motor with a damping factor $0 < k < 1$ and produce an output which is inputted into the comparator circuit (E).

The comparator circuit (E) serves to compare the outputs from the sample hold circuit (C) and attenuator circuit (D) and to produce an output signal when the output from the attenuator circuit (D) becomes greater than the output from the sample hold circuit (C). The output 1 in FIG. 3 corresponds thereto.

The abnormal overload detecting circuit (F) serves to produce an output signal when a value corresponding to the power consumption of the associated electric motor exceeds a predetermined value (variable) as a result of some abnormality or accident. The output 2 in FIG. 3 corresponds thereto.

The operations of the components described above will now be described in due order. By way of example, power detection will be described. In addition, current detection may be considered in the same way.

First of all, variations in the power of the electric motor under consideration are derived as variations in voltage from the power detecting circuit (A). This voltage signal is attenuated to a suitable value within the range $0 < k < 1$ through the attenuator circuit (D) and then sent to the comparator circuit (E).

In the sample hold circuit (C), a no-load value or lightload value for the above mentioned voltage variation signal is appointed on the basis of an external signal and such value is fed into the other input terminal of the comparator circuit (E), where it is compared with the output from the attenuator circuit (D). At the instant that the output from the attenuator circuit (D) becomes greater, there will be obtained an output 1, which is coupled with an electrically controlled speed change device, whereby it is utilized as a gap eliminator.

Further, at the instant that the voltage variation signal from the power detecting circuit (A) exceeds the overload set value of the abnormal overload detecting circuit (F), an output 2 is produced, which output is utilized to bring the machine to a stop in order to avoid damage to the machine and secure safety for the operator.

As has so far been described, according to the present invention, there are provided a band-pass filter circuit → a level adjusting circuit → a phase inverter circuit so as to satisfy the relation $f(t) = P - a \sin \omega t$ and an output $f(t) + a \sin \omega t$ obtained through a power detecting circuit is added to power P in a periodic low-frequency noise eliminating circuit, whereby it is converted into an output $f(t)$. An output $f(t_0)$ under no or light load condition of the electric motor is stored in a sample hold circuit (C), while an output under loaded condition is converted into $kf(t)$ by the attenuator circuit. Since the deviation value from said comparator circuit is sent as an output 1 and since an abnormal overload value detecting circuit whose level setting is variable is incorporated to send an abnormal overload value signal as an output 2, in the case where a machine for performing a machining operation through relative contact between a workpiece and a tool as in cutting and grinding is equipped with an electrically controlled speed change mechanism, it is possible to effect quick feed until the workpiece and the tool come in contact with each other, while detecting the changing power or current upon said contact to produce a signal at the instant. Therefore, the apparatus according to the present invention thus arranged performs the function of the so-called gap eliminator in that by changing the speed of the machine to a value suitable for a particular machining operation, it is possible to eliminate dead time resulting from the fact that the position of a position detecting instrument for speed change for large workpieces having a large amount of scatter in size is set to correspond to the maximum dimension. At the same time, the apparatus contributes to the avoidance of damage to the machine as well as safety for the operator in that there is obtained another output signal which responds even to an instantaneous and relatively small overload which cannot be detected by an ordinally overload relay for electric motors.

Thus, the periodic noise eliminating circuit according to the present invention precludes time lag as would occur in generally employed filters and eliminates periodic noise otherwise produced by a belt or the like, so that a highly accurate stable power or current signal can be obtained. Further, the setting of a value by which the output from the power conversion circuit (A) or current conversion circuit deviates from the reference value does not resort to a mere difference, and influences of variations in power source voltage can be minimized in that ratios are taken through an attenuator with attention paid to the fact that the power source voltages relatively vary throughout the region. Further, by virtue of the abnormal overload value detecting circuit (F), the accuracy and response are much higher than those of generally employed overload relays, and adjustment is possible over a wide range.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A gap eliminator for use in machine tools and the like having an associated electric motor, said gap eliminator comprising a power detecting circuit operatively connected to the electric motor for detecting the power or current of said motor under no-load or light conditions and producing a first output signal thereof under such conditions, a periodic low-frequency noise eliminating circuit electrically coupled with said power detecting circuit for converting an output signal $f(t) = a \cdot sn\omega t$ from the power detecting circuit into an output signal $f(t)$, said noise eliminating circuit including band-pass filter circuits whereby a signal wave fed therein is put to the phase of $a \cdot sin\omega t$, a level adjuster circuit for causing the signal wave fed from said band-pass filter circuits and to appear as $a \cdot sin\omega t$ by adjusting its volume, a phase inverter circuit for inverting the phase of the signal wave fed from said level adjuster circuit so as to provide $-a \cdot sin\omega t$, and an adder circuit for adding together the power and the signal wave $-a \cdot sin\omega t$ which has fed from said phase inverter to provide the desired signal $f(t)$, a sample hold circuit electrically coupled to said noise eliminating circuit for receiving and storing the first output signal from the detecting circuit when the motor is under a no-load or light load condition, attenuator circuit means electrically coupled with said noise eliminating circuit in parallel with the sample hold circuit for producing a second output signal when said motor is under a loaded condition, and a comparator circuit for comparing said first and second output signals, said comparator circuit including means providing a deviation value as an output signal to control the feed rate of the machine tool.

2. A gap eliminator in accordance with claim 1, wherein said gap eliminator includes a variable level-setting, abnormal overload value detecting circuit, said detecting circuit including means to generate an output signal upon an abnormal overload condition occurring, said output signal being coupled to the motor to stop the operation of the machine tool upon the occurrence of an overload condition.

* * * * *